US010032540B2

(12) United States Patent
Obika et al.

(10) Patent No.: US 10,032,540 B2
(45) Date of Patent: Jul. 24, 2018

(54) MULTILAYER INSULATED WIRE, COIL, AND ELECTRICAL/ELECTRONIC EQUIPMENT

(71) Applicants: FURUKAWA ELECTRIC CO., LTD., Tokyo (JP); FURUKAWA MAGNET WIRE CO., LTD., Tokyo (JP)

(72) Inventors: Ryosuke Obika, Tokyo (JP); Tsuneo Aoi, Tokyo (JP)

(73) Assignees: Furukawa Electric Co., Ltd., Tokyo (JP); Furukawa Magnet Wire Co., Ltd., Tokyo (JP)

( * ) Notice: Subject to any disclaimer, the term of this patent is extended or adjusted under 35 U.S.C. 154(b) by 0 days.

(21) Appl. No.: 15/192,223

(22) Filed: Jun. 24, 2016

(65) Prior Publication Data

US 2016/0307664 A1    Oct. 20, 2016

Related U.S. Application Data

(63) Continuation of application No. PCT/JP2014/083365, filed on Dec. 17, 2014.

(30) Foreign Application Priority Data

Dec. 26, 2013 (JP) .................................. 2013-270575

(51) Int. Cl.
*H01B 3/30* (2006.01)
*C09D 171/00* (2006.01)
(Continued)

(52) U.S. Cl.
CPC ............ *H01B 3/308* (2013.01); *C09D 171/00* (2013.01); *H01B 3/30* (2013.01); *H01B 3/307* (2013.01);
(Continued)

(58) Field of Classification Search
USPC ...................................................... 174/117 F
See application file for complete search history.

(56) References Cited

U.S. PATENT DOCUMENTS 4,778,245 A * 10/1988 Ueno .................. G02B 6/4429
                                                385/113
4,919,462 A *  4/1990 Matsui ................ H02G 3/0691
                                                285/125.1
(Continued)

FOREIGN PATENT DOCUMENTS

EP          0366700 B1    1/1993
GB          2052308 A     1/1981
(Continued)

OTHER PUBLICATIONS

International Search Report for PCT/JP2014/083365 dated Mar. 10, 2015.
(Continued)

*Primary Examiner* — William H Mayo, III
*Assistant Examiner* — Krystal Robinson
(74) *Attorney, Agent, or Firm* — Birch, Stewart, Kolasch & Birch, LLP

(57) ABSTRACT

A multilayer insulated wire having a polyester-based resin layer formed of a polyester-based resin containing at least a trihydric or higher hydric alcohol constituent on a conductor, and a PEEK resin layer formed of polyether ether ketone or modified polyether ether ketone, directly or by interposing an intermediate layer, on the polyester-based resin layer; a coil formed by winding processing the insulated wire, and electronic/electrical equipment having the coil.

9 Claims, 1 Drawing Sheet

(51) Int. Cl.
*H01F 5/06* (2006.01)
*H01B 3/42* (2006.01)
*H02K 3/30* (2006.01)

(52) U.S. Cl.
CPC ............... *H01B 3/42* (2013.01); *H01B 3/421* (2013.01); *H01B 3/422* (2013.01); *H01B 3/423* (2013.01); *H01B 3/427* (2013.01); *H01F 5/06* (2013.01); *H02K 3/30* (2013.01); *C08G 2650/40* (2013.01)

(56) References Cited

U.S. PATENT DOCUMENTS

| | | | | |
|---|---|---|---|---|
| 6,085,795 | A * | 7/2000 | Ogawa | B60R 16/0222 138/108 |
| 6,968,864 | B2 * | 11/2005 | Miyamoto | B60R 16/0215 138/108 |
| 2002/0000499 | A1 * | 1/2002 | Aoki | F16L 3/10 248/74.4 |
| 2002/0104676 | A1 * | 8/2002 | Treutlein | B32B 7/04 174/117 F |
| 2009/0314511 | A1 * | 12/2009 | Hagi | H01R 4/726 174/78 |
| 2010/0006442 | A1 * | 1/2010 | Lochtman | C23C 18/1641 205/50 |
| 2012/0212931 | A1 * | 8/2012 | Kinoshita | G02B 6/0003 362/84 |

FOREIGN PATENT DOCUMENTS

| | | | | |
|---|---|---|---|---|
| JP | 5837067 | A * | 3/1983 | ........... C09D 167/00 |
| JP | 8-12941 | A | 1/1996 | |
| JP | 2000-260232 | A | 9/2000 | |
| JP | 2005-203334 | A | 7/2005 | |
| JP | 2005203334 | A * | 7/2005 | |

OTHER PUBLICATIONS

Written Opinion of the International Searching Authority for PCT/JP2014/083365 (PCT/ISA/237) dated Mar. 10, 2015.
Extended European Search Report, dated Jul. 14, 2017, for corresponding European Application No. 14874980.7.

* cited by examiner

MULTILAYER INSULATED WIRE, COIL, AND ELECTRICAL/ELECTRONIC EQUIPMENT

CROSS-REFERENCE TO RELATED APPLICATIONS

This application is a continuation of PCT/JP2014/083365 filed on Dec. 17, 2014 which claims benefit of Japanese Patent Application No. 2013-270575 filed on Dec. 26, 2013, the subject matters of which are incorporated herein by reference in their entirety.

TECHNICAL FIELD

The present invention relates to a multilayer insulated wire, a coil, and electrical/electronic equipment.

BACKGROUND ART

In coils for electrical equipment such as inverter-related equipment, for example, high-speed switching devices, inverter motors and transformers, electrical insulated wires (insulated wires), which are enameled wires, are mainly used as magnet wires.

As such insulated wires, multilayer insulated wires having a plurality of covering resin layers formed of resins having different properties are known. For example, Patent Literature 1 proposes composite enameled wires having a polyester resin coating layer and a low imide-modified polyester resin coating layer.

CITATION LIST

Patent Literatures

Patent Literature 1: JP-A-2000-260232 ("JP-A" means unexamined published Japanese patent application)

SUMMARY OF INVENTION

Technical Problem

It is required for insulated wires to minimize partial discharge deterioration caused by an inverter surge. Therefore, studies have been conducted on a method of increasing a partial discharge inception voltage, and one of them includes a method of increasing a thickness of a covering resin layer provided on a conductor. However, in the case where the thickness of the covering resin layer is increased, while electrical properties such as withstand voltage properties are excellent, adhesion with the conductor is reduced. That is, even if the thickness of the covering resin layer is merely increased, satisfaction of both improvement of the electrical properties and the adhesion between the conductor and the covering resin layer has been difficult.

In the meantime, the insulated wires assembled into electrical equipment are subjected to bending processing (winding processing). Mechanical stress acts on the multilayer insulated wires during bending processing. Cracking is caused in the covering resin layer by this mechanical stress in several cases.

Such cracking easily occurs in an outer covering resin layer arranged as the outerlayer in the multilayer covering resin layer, and cracking is also caused in an inner covering resin layer arranged the innerlayer therein with the cracking in the outer covering resin layer as a starting point in several cases. When such inner covering resin layer cracking reaches the conductor (the inner covering resin layer cracking that reach the conductor with the outer covering resin layer cracking as the starting point is referred to as "cracks reaching the conductor"), insulation performance of the multilayer covering resin layer formed of the inner covering resin layer and the outer covering resin layer is adversely affected.

In the meantime, advance of the electrical or electronic equipment (also referred to as electrical equipment) represented by rotating electric machines or transformers, has been progressed resulting in size reduction and improved performance. Thus, it becomes usual in many cases that insulated wires are used in such a way that the insulated wires are processed by winding (coil processing) and they are pushed into a quite small space to pack. In this way, it is no exaggeration to say that the performance of a rotating electric machine, such as a motor, is determined by how many coils produced by coil processing the insulated wires into a coil shape can be held in a stator slot. As a result, improvement of the ratio of the sectional area of conductors to the sectional area of the stator slot (space factor) has been required to be particularly highly increased. For the reasons discussed above, it has been lately attempted to use a rectangular wire in which the conductor has a cross-sectional shape similar to a quadrilateral (square or rectangle), as a means for increasing the space factor.

However, when the multilayer insulated wires are used in such electrical equipment, the multilayer insulated wires are subjected to bending processing at a small size, and therefore larger mechanical stress acts thereon, and the adhesion between the multilayer covering resin layer and the conductor is significantly reduced.

In particular, development has recently progressed on HV (hybrid vehicle) or EV (electric vehicle) in which a rotating electric machine is utilized as a driving motor, and a demand for reducing a space of a coil end increasingly grows in order to achieve size reduction of the motor itself. As a result, the mechanical stress acted thereon during the bending processing is further increased, the multilayer covering resin layer is peeled from the conductor during the bending processing, and the cracks reaching the conductor easily occur. In order to respond to rapid progress of such achievement of high performance and the like, development of specific performance and improvement of a demand level, the conventional technologies have been far from satisfactory yet.

In the case where the multilayer insulated wires are used in the motor for HV or EV, and the like, the multilayer insulated wires assembled into the motor are exposed to ATF oil under a high temperature environment, and therefore durability against the ATF (also referred to as insulation reliability on the ATF or ATF resistance) is also required in addition to the adhesion with the conductor, the bending processability (prevention of occurrence of the cracks reaching the conductor) and the electrical properties.

Accordingly, the present invention is contemplated for providing a multilayer insulated wire satisfying both improvement of the electrical properties and improvement of the adhesion with the conductor, and having difficulty in occurrence of the cracks reaching the conductor in the multilayer covering resin layer and preferably having excellent ATF resistance, a coil and electrical or electronic equipment using this multilayer insulated wire.

Solution to Problem

The present inventors diligently continued to conduct study on improvement of electrical properties, improvement of adhesion with a conductor and prevention of cracks reaching the conductor. As a result, the present inventors found that a specific combination between a covering resin layer provided on an innermost side on the conductor and a covering resin layer provided on an outermost side on the conductor are related with the improvement of electrical properties, the improvement of adhesion with the conductor and prevention of the cracks reaching the conductor. When the present inventors further continued to conduct study, the present inventors found that both the electrical properties and the adhesion with the conductor, satisfaction of which was difficult so far, can be improved, and both the electrical properties and the adhesion with the conductor can be improved, and occurrence of cracks reaching the conductor can also be prevented, in the case where a layer formed of a specific modified polyester-based resin is provided on the innermost side and a layer formed of a specific thermoplastic resin is provided thereonto. Further, the prevent inventors found that ATF resistance can also be improved by such structure. The present invention has been made based on those findings.

The above-described problems of the present invention can be solved by the following means.

(1) A multilayer insulated wire, having a polyester-based resin layer formed of a polyester-based resin containing at least a trihydric or higher hydric alcohol constituent on a conductor, and a PEEK resin layer formed of polyether ether ketone or modified polyether ether ketone, directly or by interposing an intermediate layer, on the polyester-based resin layer.

(2) The multilayer insulated wire described in the above item (1), wherein a content of the trihydric or higher hydric alcohol constituent is 30 to 90 mol % based on the total number of moles of the alcohol constituent that forms the polyester-based resin.

(3) The multilayer insulated wire described in the above item (1) or (2), wherein the trihydric or higher hydric alcohol constituent is a constituent derived from aliphatic alcohol.

(4) The multilayer insulated wire described in any one of the above items (1) to (3), wherein the trihydric or higher hydric alcohol constituent is a constituent derived from at least one kind selected from the group consisting of trihydroxyethyl isocyanurate, glycerol and trimethylolpropane.

(5) The multilayer insulated wire described in any one of the above items (1) to (4), wherein a total thickness of the polyester-based resin layer, the intermediate layer and the PEEK resin layer is 70 to 250 µm, and a proportion of the thickness of the PEEK resin layer to the total thickness is 20 to 70%.

(6) The multilayer insulated wire described in the above items (1) to (5), wherein the conductor has a rectangular cross-section.

(7) A coil formed by winding processing the multilayer insulated wire described in any one of the above items (1) to (6).

(8) Electronic/electrical equipment, having the coil described in the above item (7).

In the present invention, "layer formed of resin" means the layer is formed of the resin, and referred to as "resin layer."

Advantageous Effects of Invention

The present invention enables to provide a multilayer insulated wire satisfying both improvement of the electrical properties and improvement of the adhesion with the conductor, and having difficulty in occurrence of the cracks reaching the conductor in the multilayer covering resin layer and preferably having excellent ATF resistance, a coil and electrical or electronic equipment using this multilayer insulated wire.

Other and further features and advantages of the invention will appear more fully from the following description, appropriately referring to the accompanying drawings.

MODE FOR CARRYING OUT THE INVENTION

<<Multilayer Insulated Wire>>

A multilayer insulated wire (also referred to as a multilayer insulation wire) according to the present invention has a conductor, a polyester-based resin layer provided on the conductor, and a PEEK resin layer formed of polyether ether ketone or modified polyether ether ketone (hereinafter, referred to as a PEEK resin in several cases) provided on the polyester-based resin layer directly or by interposing an intermediate layer formed of any other insulated layer, for example.

In the present invention, the polyester-based resin layer is formed directly on an outer periphery of the conductor.

In the present invention, the polyester-based resin layer, the intermediate layer and the PEEK resin layer may be one layer or may be formed of a plurality of layers including two or more layers, respectively.

In the present invention, in the case where the layers in which the resins constituting (forming) the layers and additive contained are completely the same are laminated adjacent to each other, such layers are counted as one layer in all.

On the other hand, in the case where even the layers in which the resins constituting (forming) the layers and the additives contained are completely the same are not laminated adjacent to each other, namely in the case where the layers are laminated by interposing any other layer, each layer is counted as one layer.

Moreover, in the case where the layers in which the layers are formed of the same resin, but kinds of additives or amounts of compounding of the additives are different are laminated, each layer is counted as one layer, regardless of whether or not the layers are adjacent to each other.

Hereinafter, preferable embodiments of the multilayer insulated wire of the present invention will be explained, with reference to the drawings. But the present invention is not meant to be limited by these.

Figure 1:
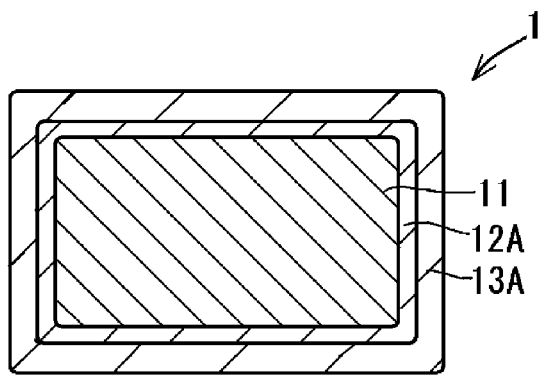
FIG. 1 is a schematic cross-sectional view showing a preferred embodiment of the multilayer insulated wire of the present invention.

A preferred multilayer insulated wire 1 of the present invention, a cross-sectional view of which is shown in FIG. 1 has a conductor 11, a polyester-based resin layer 12A provided on an outer periphery of the conductor 11, and a PEEK resin layer 13A provided on an outer periphery of the polyester-based resin layer 12A as an outermost layer. The thickness of the PEEK resin layer 13A is adjusted to be larger than the thickness of the polyester-based resin layer 12A.

Figure 2:
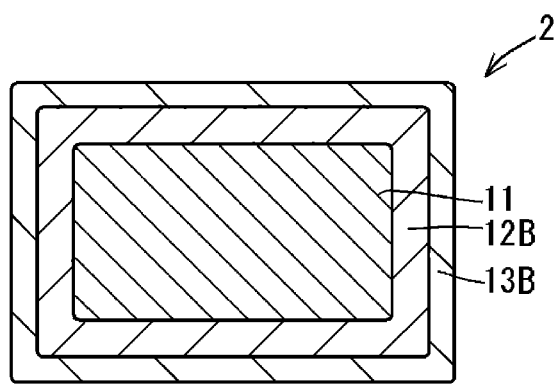
FIG. 2 is a schematic cross-sectional view showing another preferred embodiment of the multilayer insulated wire of the present invention.

A preferred multilayer insulated wire 2 of the present invention, a cross-sectional view of which is shown in FIG. 2 is the same as the multilayer insulated wire 1 except that a thickness of the polyester-based resin layer 12B and the PEEK resin layer 13B each is different. The thickness of the PEEK resin layer 13B is adjusted to be equal to or smaller than the thickness of the polyester-based resin layer 12B.

Figure 3:
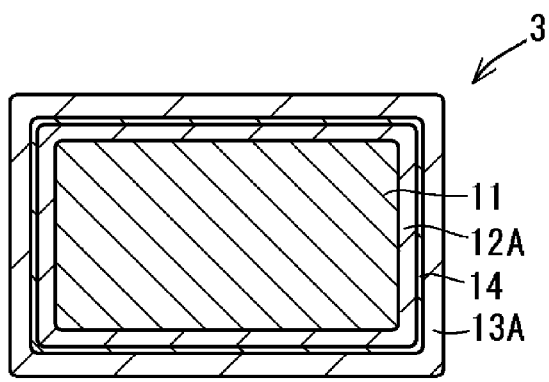
FIG. 3 is a schematic cross-sectional view showing still another preferred embodiment of the multilayer insulated wire of the present invention.

A preferred multilayer insulated wire 3 of the present invention, a cross-sectional view of which is shown in FIG. 3 is the same as the multilayer insulated wire 1 except that the multilayer insulated wire 3 has an intermediate layer 14 between the polyester-based resin layer 12A and the PEEK resin layer 13A. That is, the multilayer insulated wire 3 has a conductor 11, a polyester-based resin layer 12A, intermediate layer 14 provided on an outer periphery of the polyester-based resin layer 12A, and a PEEK resin layer 13A provided on an outer periphery of the intermediate layer 14.

Hereinafter, the multilayer insulated wire of the present invention is described in order from a conductor.

<Conductor>

As for the conductor used in the present invention, a material thereof is not limited, as long as it has electrical conductivity. Examples thereof include copper, a copper alloy, aluminum, an aluminum alloy, and the like. In a case where the conductor made of copper, for example, when copper is melted by heat for weld, from the viewpoint of preventing generation of void at the welding portion due to contained oxygen, preferably the copper has its content of 99.96% or more and is preferably a low-oxygen copper having an oxygen content of preferably 30 ppm or less, more preferably 20 ppm or less, or an oxygen-free copper. In a case where the conductor made of aluminum, from the viewpoint of a required mechanical strength, various aluminum alloys can be used. For example, for such a use as a rotating electrical machine, a 99.00% or more-grade pure aluminum by which a high current value can be obtained is preferred.

As a cross-sectional shape of the conductor, any of round or rectangular (flat square-shaped) conductor is acceptable. In view of suppressing a partial discharge from a corner portion, the rectangular conductor has preferably such a shape that chamfered edges (curvature radius r) are provided at four corners as shown in FIGS. 1 to 3. The curvature radius r is preferably 0.6 mm or less and more preferably in a range from 0.2 to 0.4 mm.

The size of the conductor is not particularly limited, but in the case of the rectangular conductor, the width (long side) thereof is preferably from 1 to 5 mm, and more preferably from 1.4 to 4.0 mm, and the thickness (short side) is preferably from 0.4 to 3.0 mm, and more preferably from 0.5 to 2.5 mm. The ratio of length of the width (long side) to the thickness (short side) is preferably from 1:1 to 4:1. In the present invention, the rectangle includes a quadrate and a square in the meaning.

In the case of the round conductor, a radius is preferably 0.3 to 3.0 mm, and further preferably 0.4 to 2.7 mm.

<Polyester-Based Resin Layer>

A polyester-based resin layer is formed of a polyester-based resin containing at least a trihydric or higher hydric alcohol constituent. This polyester-based resin is a resin having an ester bond in a molecule, and contains at least a trihydric or higher hydric alcohol constituent as an alcohol constituent forming the ester bond.

Such a polyester-based resin layer only needs to have the above-described structure, and specific examples forming the layer include a polyester-based resin having an ester bond in the molecule and a polyesterimide resin having both an ester bond and an imide bond in the molecule. These resins are preferable in view of a capability of improving adhesion with the conductor, preventing occurrence of cracks reaching the conductor, and improving both electrical properties and ATF resistance in cooperation with the PEEK resin layer.

Valency of the alcohol serving as the trihydric or higher hydric alcohol constituent is three or more. In the case where the valency is three or more, the number of terminal groups per one molecule of the polyester-based resin increases, and the adhesion with the conductor and the like can be improved without reducing the electrical properties. The reason (mechanism) is not known exactly yet, but considered as follows. That is, peeling between the conductor and the polyester-based resin layer can be prevented by improved adhesion with the conductor upon application of stress by excessive bending processing. Furthermore, the peeling between the conductor and the polyester-based resin layer can be prevented even when extreme coil processing is performed. Thus, stress concentration at the intermediate layer or the PEEK resin layer can be reduced, and therefore the occurrence of cracks reaching the conductor can be prevented.

The valency of alcohol is preferably trihydric in view of an excellent effect on improving the adhesion with the conductor while maintaining the electrical properties, an effect on preventing the occurrence of cracks reaching the conductor and the ATF resistance.

The above-described alcohol may be any of aliphatic alcohol, aromatic alcohol or the like. Aliphatic alcohol is preferable in view of flexibility of the polyester-based resin layer, and the like. In addition, both an aliphatic group and an aromatic group from which a hydroxy group is eliminated may be a hydrocarbon group consisting of a carbon atom and a hydrogen atom, or a group containing a heteroatom, such as a heterocyclic group, for example.

As the aliphatic alcohol, one having a hydroxyethyl moiety or a hydroxymethyl moiety in a partial structure is preferable, and examples thereof include one having at least two of these partial structures and one having three thereof. Specific examples include trihydroxyethyl isocyanurate (also referred to as tris(2-hydroxyethyl) isocyanurate), glycerol, trimethylolpropane, pentaerythritol, dipentaerythritol, hexanetriol and sorbitol. Above all, trihydroxyethyl isocyanurate, glycerol and trimethylolpropane are preferable.

Specific examples of the aromatic alcohol include trihydroxybenzyl alcohol.

In the case where this polyester-based resin contains an alcohol constituent other than the trihydric or higher hydric alcohol constituent (in the present invention, referred to as a dihydric alcohol constituent), the dihydric alcohol constituent is not particularly limited, as long as the constituent is derived from dihydric alcohol. Examples thereof include aliphatic diol and aromatic diol. In addition, the aliphatic group and the aromatic group are as described above.

Specific examples of such a dihydric alcohol constituent include one derived from kinds of alcohol, alkylene glycol such as ethylene glycol, diethylene glycol, propylene glycol, dipropylene glycol, neopentyl glycol, 1,3-butanediol and 1,4-butanediol. Above all, alkylene glycol is preferable, and ethylene glycol is further preferable, in view of flexibility.

In the present invention, the trihydric or higher hydric alcohol constituent is preferably used simultaneously with the dihydric alcohol constituent.

In addition, in the present invention, the alcohol constituent may contain one derived from monohydric alcohol within the range in which objects of the invention are not adversely affected.

In this polyester-based resin, a content of the trihydric or higher hydric alcohol constituent is preferably 30 to 90 mol % based on the total number of moles of the alcohol constituent that constitutes the polyester-based resin. In the case where the content is within the above-described range, the adhesion with the conductor is improved without influencing the electrical properties, and the effect on preventing the occurrence of cracks reaching the conductor is enhanced. The above-described content is further preferably 40 to 80 mol % in view of simultaneously having all of the electrical properties, the adhesion with the conductor and the effect on preventing the occurrence of cracks reaching the conductor at a further higher level.

Here, the above-described content can be calculated from a content (moles) of total alcohol components and a content (moles) of the trihydric or higher hydric alcohol constituent in the polyester-based resin. This content can be measured, for example, by a componential analysis by thermal decomposition or chemical decomposition, a structural analysis by NMR, or the like.

A constituent other than the above-described alcohol constituent among the constituents that form the polyester-based resin is appropriately selected according to a kind of resin.

For example, in the case where a polyester-based resin is selected, specific examples include a carboxylic acid constituent derived from a divalent or higher valent carboxylic acid (including anhydride thereof, ester thereof and the like).

Specific examples of such carboxylic acid include aliphatic carboxylic acid and aromatic carboxylic acid, and aromatic carboxylic acid is preferable.

Valency of the carboxylic acid is not particularly limited, as long as the valency is divalent or more, and divalent is preferable, and only divalent is further preferable.

The carboxylic acid that can be used in the present invention is not particularly limited, as long as the carboxylic acid is ordinarily used for the polyester-based resin, and specific examples thereof include terephthalic acid, isophthalic acid, naphthalenedicarboxylic acid, trimellitic acid, 1,3,5-benzenetricarboxylic acid, pyromellitic acid and 1,2,4,5-cyclohexanetetracarboxylic acid. Above all, terephthalic acid (including anhydride thereof, ester thereof and the like) is preferable, terephthalic acid alkyl ester is further preferable, and terephthalic acid alkyl (the number of carbon atoms: 1 to 3) ester is still further preferable.

In the case where the polyester-based resin is a polyesterimide resin, specific examples of the above-described constituent include a carboxylic acid constituent derived from divalent or higher valent carboxylic acid (including anhydride thereof, ester thereof and the like) and an amine constituent derived from a divalent or higher valent amine compound (including an isocyanate compound corresponding thereto).

The carboxylic acid to be used for the polyesterimide resin, and serving as the carboxylic acid constituent is as described above, and valency thereof is preferably 2 to 3, and divalent is further preferable, and only divalent is still further preferable.

Trivalent or higher valent carboxylic acid is not particularly limited, and specific examples thereof include tricarboxylic anhydride and tetracarboxylic dianhydride. Specific examples of the tricarboxylic anhydride include trimellitic anhydride, hemimellitic anhydride, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'-diphenylethertricarboxylic anhydride and 3,4,4'-benzophenonetricarboxylic anhydride.

The amine compound is not particularly limited, as long as the amine compound is ordinarily used for the polyesterimide resin, and examples thereof include a divalent or higher valent amine compound, and may be an aromatic amine compound or an aliphatic amine compound. Specific examples thereof include diaminodiphenylmethane, diaminodiphenyl ether, diaminodiphenyl sulfone, m-xylylene diamine, p-xylylene diamine, alkylene diamine, p-phenylene diamine, m-phenylene diamine, silicone diamine, bis(3-aminopropyl)etherethane, 3,3'-diamino-4,4'-dihydroxydiphenyl sulfone (SO2-HOAB), 4,4'-diamino-3,3'-dihydroxybiphenyl (HOAB), 2,2-bis[4-(4-aminophenoxy)phenyl]hexafluoropropane (HOCF3AB), siloxane diamine, bis(3-aminopropyl)etherethane, N,N-bis(3-aminopropyl)ether, 1,4-bis(3-aminopropyl)piperazine, isophorone diamine, 1,3'-bis(aminomethyl)cyclohexane, 3,3'-dimethyl-4,4'-diaminohexylmethane, 4,4'-methylenebis(cyclohexylamine), 4,4'-diaminodiphenyl ether (DDE), 3,4'-diaminodiphenyl ether (m-DDE), 3,3'-diaminodiphenyl ether, 4,4'-diamino-diphenyl sulfone (p-DDS), 3,4'-diamino-diphenyl sulfone, 3,3'-diamino-diphenyl sulfone, 2,4'-diaminodiphenyl ether, 1,3-bis(4-aminophenoxy)benzene (m-TPE), 1,3-bis(3-aminophenoxy)benzene (APB), 2,2-bis[4-(4-aminophenoxy)phenyl]propane (BAPP), 2,2-bis[4-(4-aminophenoxy)phenyl]hexafluoropropane (HF-BAPP), bis[4-(4-aminophenoxy)phenyl]sulfone (p-BAPS), bis[4-(3-aminophenoxy)phenyl]sulfone (m-BAPS), 4,4'-bis(4-aminophenoxy)biphenyl (BAPB), 1,4-bis(4-aminophenoxy)benzene (p-TPE), 4,4'-diaminodiphenyl sulfide (ASD), 3,4'-diaminodiphenyl sulfide, 3,3'-diaminodiphenyl sulfide, 3,3'-diamino-4,4'-dihydroxydiphenyl sulfone, 2,4-diaminotoluene (DAT), 2,5-diaminotoluene, 3,5-diaminobenzoic acid (DABz), 2,6-diaminopyridine (DAPy), 4,4'-diamino-3,3'-dimethoxybiphenyl (CH3OAB), 4,4'-diamino-3,3'-dimethylbiphenyl (CH3AB) and 9,9'-bis(4-aminophenyl)fluorene (FDA), and an isocyanate compound thereof.

As the amine compound, a divalent amine compound is preferable, and diphenylmethane diamine is further preferable.

When the number of moles of a total carboxy group in the polyesterimide resin is taken as 100, a content of the amine compound is preferably 1 to 30 moles, and further preferably 2 to 20 moles in terms of the number of moles of a total amino group.

In the polyester-based resin, the total number of moles of the hydroxyl group in the alcohol constituent is preferably larger than the total number of moles of a functional group other than the hydroxyl group, in which the functional groups are not used for imidization, namely form the ester bond, in view of the adhesion with the conductor, and the like. That is, the polyester-based resin preferably has the hydroxyl group at a terminal.

In the present invention, an excessive amount of the total number of moles of the hydroxyl group is not particularly limited. When the total number of moles of the functional group other than the hydroxyl group, in which the functional groups are not used for imidization, is taken as 100 moles, the total number of moles of the hydroxyl group is preferably 105 to 200 moles, and further preferably 110 to 170 moles.

In addition, the above-described functional group is a group that may form the polyester-based resin with the hydroxyl group in the alcohol constituent, and specific examples thereof include a group that may form an ester bond and an imide bond.

The polyester-based resin may be a resin of a modified polyester-based polymer containing the above-described trihydric or higher hydric alcohol constituent partially or wholly in the alcohol constituent or may be a blended resin of the modified polyester-based polymer with an unmodified polyester-based polymer without containing the above-described trihydric or higher hydric alcohol constituent as the alcohol constituent.

As the polyester-based resin, a commercially available product can be used, and a synthesized product can also be used.

Specific examples of the resin of the modified polyester-based polymer include Neoheat 8242 (trade name, manufactured by Totoku Toryo Co., Ltd.).

In addition, specific examples of the modified polyester-imide copolymer include Neoheat 86242 (trade name, manufactured by Totoku Toryo Co., Ltd.) or Neoheat 86242 (trade name, manufactured by Dainichiseika Color & Chemicals Mfg. Co., Ltd.).

The modified polyester-based polymer can be synthesized by performing polycondensation of compounds each serving as a constituent, according to a publicly known method. On the above occasion, the compounds each serving as the constituent are used at a content of the trihydric or higher hydric alcohol constituent, and preferably a proportion satisfying the above-described number of moles of the alcohol constituent.

Regarding these polyester-based resins, only one kind thereof may be used alone, or more than one kind thereof may be used by mixture.

Further, in the case where a polyester-based resin layer is formed of a plurality of the layers, the polyester-based resins which are different from each other in each layer may be used, or polyester-based resins whose mixing ratios are different from each other in each layer may be used.

The polyester-based resin layer can be formed by applying resin varnish containing the polyester-based resin on the conductor, and baking it.

The resin varnish used may contain various kinds of additives or the like, such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, to the extent that the characteristics are not affected, in the addition to the polyester-based resin.

Furthermore, a layer formed from a resin containing these additives may be laminated on the resulting insulated wire, or the insulated wire may be coated with a coating material containing these additives.

A powder having a high aspect ratio such as a glass fiber and a carbon nanotube may be added to a coating material and the obtained varnish may be baked in order to improve a tensile modulus of the polyester-based resin layer. By addition of such powder, the powder is aligned in the flow direction of the wire at the processing, so that the wire is strengthened in the bend direction.

The resin varnish contains an organic solvent and the like so as to make the polyester-based resin be a varnish. The organic solvent is not particularly limited as long as the organic solvent does not inhibit the reaction of the polyester-based resin, and examples thereof include amide-based solvents such as N-methyl-2-pyrrolidone (NMP), N,N-dimethylacetamide (DMAC), and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, solvent naphtha, and cyclohexane; phenol-based solvents such as cresol, phenol, and halogenated phenol; sulfone-based solvents such as sulfolane; and dimethylsulfoxide (DMSO).

Of these organic solvents, amide-based solvents, urea-based solvents and hydrocarbon-based solvents are preferred; and in view of a solvent without a hydrogen atom that is apt to inhibit a crosslinking reaction due to heating, N-methyl-2-pyrrolidone, N,N-dimethylacetamide, N,N-dimethylethyleneurea, N,N-dimethylpropyleneurea and tetramethylurea are more preferred.

Moreover, the hydrocarbon-based solvent is also further preferable in view of a capability of directly using a polymerization solvent of the polyester-based copolymer.

Regarding the organic solvent and the like, one kind may be used alone, or two or more kinds may be used in mixture.

<PEEK Resin Layer>

In the present invention, the multilayer insulated wire has the PEEK resin layer as an extrusion covering on the polyester-based resin layer.

An advantage of providing the PEEK resin layer as the extrusion covering is to have no necessity of passing the wire through a baking furnace in a production process, and therefore to have a capability of increasing the thickness of the PEEK resin layer without growing a thickness of an oxide covering layer on the conductor.

In the present invention, in the case where the wire has the PEEK resin layer on the polyester-based resin layer, the electrical properties can be maintained, and the occurrence of cracks reaching the conductor can be prevented even if cracking is caused in the PEEK resin layer, and the ATF resistance can also be improved. Moreover, in the case where the PEEK resin layer is formed as an outermost layer of a multilayer resin covering, the heat resistance of the insulated wire is further improved.

The PEEK resin layer contains at least one of polyether ether ketone and modified polyether ether ketone.

Specific examples of PEEK include commercially available products such as KetaSpire KT-820 (trade name, manufactured by Solvay Specialty Polymers K.K.), and PEEK450G (trade name, manufactured by Victrex Japan Inc.). Specific examples of modified PEEK include commercially available products of AVASPIRE AV-650 (trade name, manufactured by Solvay Specialty Polymers K.K.).

Examples of the modified PEEK include PEEK-based PPS, PES, PPSU or PEI polymer alloys and, for example, trade name: AVASPIRE AV-621, AV-630, AV-651, AV-722, AV-848, and the like, manufactured by Solvay Specialty Polymers K.K., can be used.

It is needless to say that the PEEK and modified PEEK to be used are not limited by the above-described resin names, and resins other than those recited above also can be used, as long as they are superior in performance to those resins.

Regarding the PEEK and modified PEEK, one kind may be used alone, or two or more kinds may be used in mixture.

Moreover, in the case where the PEEK resin layer is formed of a plurality of layers, PEEK or modified PEEK different from each other in each layer may be used, or PEEK or modified PEEK whose mixing ratio is different from each other in each layer may be used.

In the case where more than one kind of PEEK and modified PEEK are used in mixture, for example, both resins can be used by subjecting them to polymer alloy thereby making a compatible type uniform mixture, or can be used by forming a non-compatible blend into a compatible state with a compatibilizing agent.

In the present invention, the above-mentioned various additives may be contained in a raw material from which the PEEK resin layer is obtained within the range in which properties are not influenced. Furthermore, a layer formed from a resin containing these additives may be laminated on the resulting insulated wire, or the insulated wire may be coated with a coating material containing these additives.

<Intermediate Layer>

In the present invention, as shown in FIG. 3, an intermediate layer 14 is also preferably provided between a polyester-based resin layer 12A and a PEEK resin layer 13A. As such an intermediate layer, an intermediate layer formed of an insulating layer is preferable, and for example, a layer formed of a resin having a function that enhances adhesion between the polyester-based resin layer and the PEEK resin layer or a function that improves the heat resistance is preferable. By providing such an intermediate layer, the peeling of the PEEK resin against processing, abrasion, heating and the like can be prevented, and processing resistance, heat resistance and durability can be improved.

The intermediate layer is formed of a thermosetting resin or a thermoplastic resin.

As the thermosetting resin that may be used for forming the intermediate layer, the thermosetting resin is a thermosetting resin capable of forming an insulating film by coating and baking it, by interposing a polyester-based resin layer, on a conductor. Examples thereof include polyimide (PI), polyurethane, polyamideimide (PAI), a thermosetting polyester (other than a polyester resin having a trihydric or higher hydric alcohol constituent), Class H polyester, polybenzimidazole, polyesterimide (PEsI) (other than a polyesterimide resin having a trihydric or higher hydric alcohol constituent), a melamine resin, and an epoxy resin.

In the present invention, as a thermosetting resin, a thermosetting resin selected from the group consisting of polyimide, polyamideimide, Class H polyester and polyesterimide is particularly preferable in view of enabling to improve the heat resistance.

The polyimide is not particularly limited, but any of polyimide resins such as a whole aromatic polyimide and a thermosetting aromatic polyimide may be used. For example, use may be made of a commercially available product (for example, trade name, U IMIDE (manufactured by Unitika Ltd.); and trade name, U-VARNISH (manufactured by Ube Industries, Ltd.)). Or use may be made of polyimides obtained by a usual method in which an aromatic tetracarboxylic dianhydride and aromatic diamines are reacted in a polar solvent to obtain a polyamide acid solution, and then the obtained polyamide acid solution is subjected to imidization by a thermal treatment at the time of baking in formation of the coating.

The polyamideimide is not particularly limited as long as polyamideimide has a thermosetting property. As the polyamideimide, use may be made of a commercially available product (for example, trade name, HI 406, manufactured by Hitachi Chemical Co., Ltd. and trade name, HCl-series, manufactured by Hitachi Chemical Co., Ltd.). Or use may be made of polyamideimides obtained by a usual method, for example, a method in which a tricarboxylic anhydride and diisocyanates are directly reacted in a polar solvent, or a method in which diamines are reacted with a tricarboxylic anhydride in a polar solvent to previously introduce an imide bond to the reaction product, and then the reaction product is subjected to amidation using diisocyanates. Note that the polyamideimide has the properties of a lower thermal conductivity and a higher dielectric breakdown voltage than other resins, and has bake hardenability.

Regarding these thermosetting resins, only one kind thereof may be used alone, or more than one kind thereof may be used by mixture.

Further, in the case where a thermosetting resin layer is formed of a plurality of layers, the thermosetting resins which are different from each other in each layer may be used, or thermosetting resins whose mixing ratios are different from each other in each layer may be used.

In the meantime, the adhesion between the polyester-based resin layer and the PEEK resin layer can be enhanced by using the thermoplastic resin in the intermediate layer in the present invention. Such a thermoplastic resin is not particularly limited, as long as the resin is a thermoplastic resin excluding the PEEK resin and the modified PEEK resin.

As such thermoplastic resin, polyether sulfone (PES), polysulfone (PSU), polyphenylene ether (PPE), polyether imide (PEI), polyphenylsulfone (PPSU), polyarylate (PAR), or the like is preferable.

Specific examples of PES include commercially available products such as SUMIKA EXCEL 4800G (trade name, manufactured by Sumitomo Chemical Co., Ltd.), PES (trade name, manufactured by Mitsui Chemicals, Inc.), ULTRAZONE E (trade name, manufactured by BASF Japan Ltd.), and RADEL A (trade name, manufactured by Solvay Advanced Polymers Co.).

Specific examples of PPE include commercially available products such as XYRON (trade name, manufactured by Asahi Kasei Chemicals Corp.) and IUPIACE (trade name, manufactured by Mitsubishi Engineering Plastics Corp.).

Specific examples of PSU include a commercially available product of RADEL PSU (trade name, manufactured by Solvay Advanced Polymers Co.).

Specific examples of PEI include a commercially available product of ULTEM 1010 (trade name, manufactured by SABIC Innovative Plastics Holding BV).

Examples of PPSU include a commercially available product of RADEL R5800 (trade name, manufactured by Solvay Advanced Polymers Co.).

Specific examples of PAR include a commercially available product of U polymer U-100 (trade name, manufactured by Unitika Ltd.).

It is needless to say that the thermoplastic resin to be used is not limited by the above-described resin names, and resins other than those recited above also can be used, as long as they are superior in performance to those resins.

Regarding these thermoplastic resins, only one kind thereof may be used alone, or more than one kind thereof may be used by mixture.

Further, in the case where a thermoplastic resin layer is formed of a plurality of layers, the thermoplastic resins which are different from each other in each layer may be used, or thermoplastic resins whose mixing ratios are different from each other in each layer may be used. For example, a plurality of layers having a layer formed of the thermosetting resin and a layer formed of the thermoplastic resin may be applied.

In the case where more than one kind of thermoplastic resin are used in mixture, for example, both resins can be used by subjecting them to polymer alloy thereby making a compatible type uniform mixture, or can be used by forming a non-compatible blend into a compatible state with a compatibilizing agent.

In the present invention, the above-mentioned various additives may be contained in a raw material from which the intermediate layer is obtained within the range in which properties are not influenced. Furthermore, a layer formed from a resin containing these additives may be laminated on the resulting multilayer insulated wire, or the multilayer insulated wire may be coated with a coating material containing these additives.

Moreover, as an organic solvent or the like for forming the thermosetting resin or the thermoplastic resin into varnish, the above-described organic solvent can be used without being particularly limited.

<Thickness of the Multilayer Covering Resin Layer>

In the present invention, a total thickness of the multilayer covering resin layer formed of the polyester-based resin layer, the intermediate layer and the PEEK resin layer is not particularly limited, but is preferably 70 to 250 μm in view of a capability of improving the electrical properties, the space factor, the effect on preventing the occurrence of cracks reaching the conductor and the ATF resistance with a good balance.

In order that the number of passages through a baking furnace can be reduced, and adhesion between the conductor and the polyester-based resin can be prevented from being extremely lowered, the thickness of the polyester-based resin layer is preferably 70 μm or less, and further more preferably 50 μM or less. Further, in order to prevent deterioration of voltage resistance or heat resistance, which are properties required for the enameled wires as insulated wires, it is preferable that the polyester-based resin layer has a certain thickness. The lower limit of the thickness of the polyester-based resin layer is not particularly limited, as long as it is a thickness where no pinholes are formed. The thickness of the polyester-based resin layer is preferably 3 μm or more, and further more preferably 6 μm or more.

A thickness of the PEEK resin layer is not particularly limited, as long as the thickness is within the range in which the thickness dose not depart from the above-described total thickness, and is preferably 20 to 70% based on the above-described total thickness. In the case where a proportion of the thickness of the PEEK resin layer to the total thickness is within the above range, all of the adhesion with the conductor, the effect on preventing the occurrence of cracks reaching the conductor, the electrical properties and the ATF resistance can be significantly improved. In particular, the proportion of the thickness of the PEEK resin layer to the total thickness is preferably about 40%.

The thickness of the PEEK resin layer can be appropriately set, as long as the thickness is within the range in which the thickness does not depart from the above-described total thickness and the proportion of the thickness of the PEEK resin layer to the total thickness, and is preferably 20 to 175 μm, and further preferably 20 to 160 μm.

In the present invention, in the case where the intermediate layer is provided, a thickness of the intermediate layer is not particularly limited, as long as the thickness does not depart from the above-described total thickness, and is preferably 1 to 100 μm, and further preferably 5 to 50 μm.

In the case where the thickness of the intermediate layer is within the above-described range, the wire is excellent in insulation performance and bending processability.

<Electrical Properties of an Insulated Wire>

The insulated wire of the present invention is excellent in the electrical properties, the adhesion, prevention of occurrence of cracks reaching the conductor and the ATF resistance. With regards to the electrical properties, for example, a partial discharge inception voltage (PDIV) measured as described below by using Partial Discharge Tester (for example, trade name: KPD 2050, manufactured by Kikusui Electronics Corporation) is preferably 1,000 (Vp) or more, and further preferably 1,200 (Vp) or more.

Concretely, in the case where the insulated wire has a rectangular conductor, two pieces of the respective insulated wire are brought into close contact with each other with plane contact at the flat planes without any space therebetween over a length of 150 mm, thereby to produce a sample. An electrode is provided between the two conductors of each sample and connected to the two conductors of the sample. Then, while an AC voltage of 50 Hz is applied, at a temperature 25° C., the voltage is continuously raised up. Base on the voltage at the time when a partial discharge of 10 pC occurred, a peak voltage (Vp) is read. This peak voltage can be obtained as the partial discharge inception voltage.

<<Method of Producing a Multilayer Insulated Wire>>

The multilayer insulated wire can be produced by sequentially forming, on the periphery of the conductor, the polyester-based resin layer, if desired, the intermediate layer, and the PEEK resin layer.

The polyester-based resin layer can be formed by the above-described methods.

The method of coating the resin varnish may be in a usual manner. Examples of the coating method include a method of employing a die for a varnish coating, which has been manufactured so as to be similar to the shape of the conductor, and a method of employing a die that is called "universal die", which has been formed in a curb shape when the cross-section shape of the conductor is quadrangular.

The conductor having the resin varnish coated thereon is baked by a baking furnace in a usual manner. Although specific baking conditions depend on the shape of a furnace to be used, in the case where the furnace is an about 5 m-sized vertical furnace by natural convection, the baking can be achieved by setting the passing time period to 10 to 90 sec at the furnace temperature of 400 to 650° C.

The baking of the resin varnish may be performed once, but is ordinarily preferably repeated several times. When the baking is repeated several times, both identical baking conditions and different baking conditions are acceptable.

The intermediate layer can be formed by a publicly known method.

For example, when the thermoplastic resin is used, the intermediate layer can be formed according to an extrusion molding method in which the thermoplastic resin is extruded, by using an extruder, together with the conductor on which the polyester-based resin layer is formed (also referred to as an enameled wire). Conditions on this occasion can be appropriately set according to the thermoplastic resin to be used.

When the amorphous thermoplastic resin or thermosetting resin is used, the intermediate layer can also be formed by coating the varnish in which the resin has dissolved in the organic solvent or the like on the enameled wire by using a die having a shape similar to the shape of the conductor, and baking the coated varnish, in addition to the extrusion molding. The specific baking conditions, although the conditions depend on the shape of the furnace to be used and the like, are preferably conditions described in the conditions in the polyester-based resin layer.

The PEEK resin layer can be formed by a publicly known method.

For example, the PEEK resin layer can be formed according to an extrusion molding method in which the PEEK resin is extruded on a periphery of the enameled wire. Conditions on this occasion can be appropriately set according to the PEEK resin or modified PEEK resin to be used.

When the intermediate layer is formed from the thermoplastic resin, the PEEK resin is preferably extruded on the intermediate layer at a temperature higher than a glass transition temperature of the thermoplastic resin. Thus, the intermediate layer and the PEEK resin layer are thermally fused, and the adhesion therebetween is further improved.

The multilayer insulated wire of the present invention is applicable to a field which requires resistance to voltage and heat resistance, such as various kinds of electric equipment, preferably as coil formed by winding processing the wire. For example, the multilayer insulated wire of the present invention is used for a motor, a transformer and the like, which can compose high-performance electric equipment by being processed into a coil. In particular, the insulated wire is preferably used as a winding for a driving motor of HV and EV. As just described, the present invention can provide electric equipment, particularly a driving motor of HV and EV, equipped with a coil formed by winding processing the insulated wire. Meanwhile, in the case where the multilayer insulated wire of the present invention is used for a motor coil, it is also called a multilayer insulated wire for the motor coil.

In particular, the insulated wire having the above-described performance according to the present invention is preferably used as a winding wire for a driving motor of HV or EV in which achievement of size reduction and high performance has been recently significant.

EXAMPLES

The present invention will be described in more detail based on examples given below, but the invention is not meant to be limited by these.

Synthesis Example of Varnish 1

Into a flask, 0.9 mole of dimethyl terephthalate, 0.3 mole of ethylene glycol and 0.7 mole of trihydroxyethyl isocyanurate (also referred to as THEIC) (a content of THEIC is 70 mol % based on 1.0 mole in the total number of moles in an alcohol constituent, the total number of moles of a hydroxy group is 2.7 moles, the number of moles of a carboxy group is 1.8 moles, the total number of moles of the hydroxy group is 150 moles when the total number of moles of the carboxy group is taken as 100 moles) are charged, and a heating reaction was performed while the resultant mixture was stirred to progress the reaction while methanol was distilled out to raise a reaction temperature to about 220° C. When viscosity of a reaction product rapidly increased, cresol was added into this reaction system to dissolve the reaction product, and simultaneously cool a temperature of the solution to 80° C. Next, 0.04 mole of tetrabutyl titanate on a solid content was added into this solution, the resultant mixture was stirred for about 3 hours. Then, cresol and solvent naphtha were added into this reaction product and diluted to prepare modified polyester (modified PEst) varnish 1 having 40% by mass of a nonvolatile content.

Synthesis Examples of Varnish 2 to 6

Modified polyester varnish 2 to 6 were prepared, respectively, in the same manner as Synthesis Example of varnish 1 except that a total amount of use of ethylene glycol and THEIC was 1.0 mol based on 0.9 mol of dimethyl terephthalate, and an amount of use (content) of THEIC was changed as shown in Table 1 and Table 2 in Synthesis Example of varnish 1.

Synthesis Example of Varnish 7

Modified polyester varnish 7 was prepared in the same manner as Synthesis Example of varnish 1 except that glycerol (GRY) was used in place of the THEIC in Synthesis Example of varnish 1.

Synthesis Example of Varnish 8

The modified polyesterimide varnish 8 was prepared using 0.8 mole of dimethyl terephthalate, 0.2 mole of diphenylmethane diamine, 0.4 mole of trimellitic anhydride, 0.4 mole of ethylene glycol, and 0.6 mole of THEIC (a content of THEIC is 60 mol % based on 1.0 mole in the total number of moles in an alcohol constituent, the total number of moles of a hydroxy group is 2.6 moles, the total number of moles of a carboxy group that is not used for imidization is 2.0 moles, and the total number of moles of a hydroxy group is 130 moles when the total number of moles of a carboxy group that is not used for imidization is taken as 100 moles). Those compounds are charged into a flask, and a heating reaction was performed while the resultant mixture was stirred to progress the reaction while methanol was distilled out to raise a reaction temperature to about 220° C. When viscosity of a reaction product rapidly increased, cresol was added into this reaction system to dissolve the reaction product, and simultaneously cool a temperature of the solution to 80° C. Next, 0.04 mole of tetrabutyl titanate on a solid content was added into this solution, the resultant mixture was stirred for about 3 hours. Then, cresol and solvent naphtha were added into this reaction product and diluted to prepare modified polyesterimide varnish 8 having 40% by mass of a nonvolatile content.

Synthesis Example of Varnish 9

Modified polyester varnish 9 was prepared in the same manner as Synthesis Example of varnish 1 except that hexanetriol (HTO) was used in place of the THEIC in Synthesis Example of varnish 1.

Synthesis Example of Varnish 10

Into a flask, 0.9 mole of dimethyl terephthalate, 1.0 mole of THEIC (a content of THEIC is 100 mol % based on 1.0 mole in the total number of moles in an alcohol constituent, the total number of moles of a hydroxy group is 3.0 moles, the number of moles of a carboxy group is 1.8 moles, the total number of moles of the hydroxy group is 167 moles when the total number of moles of the carboxy group is taken as 100 moles) are charged, and a heating reaction was performed while the resultant mixture was stirred to progress the reaction while methanol was distilled out to raise a reaction temperature to about 220° C. When viscosity of a reaction product rapidly increased, cresol was added into this reaction system to dissolve the reaction product, and simultaneously cool a temperature of the solution to 80° C. Next, 0.04 mole of tetrabutyl titanate on a solid content was added into this solution, the resultant mixture was stirred for about 3 hours. Then, cresol and solvent naphtha were added into this reaction product and diluted to prepare modified polyester (modified PEst) varnish 10 having 40% by mass of a nonvolatile content.

Synthesis Example of Varnish 11

Into a flask, 0.8 mole of dimethyl terephthalate, 0.2 mole of diphenylmethane diamine, 0.4 mole of trimellitic anhydride, and 1.0 mole of ethylene glycol (the total number of moles of a hydroxy group is 2.0 moles, the total number of moles of a carboxy group that is not used for imidization is 2.0 moles, and the total number of moles of a hydroxy group is 100 moles when the total number of moles of a carboxy group that is not used for imidization is taken as 100 moles. A content of trihydric or higher hydric alcohol constituent is 0 mol %) are charged, and a heating reaction was performed while the resultant mixture was stirred to progress the reaction while methanol was distilled out to raise a reaction temperature to about 220° C. When viscosity of a reaction product rapidly increased, cresol was added into this reaction system to dissolve the reaction product, and simultaneously cool a temperature of the solution to 80° C. Next, 0.04 mole of tetrabutyl titanate on a solid content was added into this solution, the resultant mixture was stirred for about 3 hours. Then, cresol and solvent naphtha were added into this reaction product and diluted to prepare modified polyester-imide varnish 11 having 40% by mass of a nonvolatile content.

Synthesis Example of Varnish 12

Into a flask, 0.95 mole of dimethyl terephthalate, 0.05 mole of diphenylmethane diamine, 0.1 mole of trimellitic anhydride, 0.25 mole of ethylene glycol, and 0.65 mole of THEIC (the total number of moles of a hydroxy group is 2.45 moles, the total number of moles of a carboxy group that is not used for imidization is 2.0 moles, and the total number of moles of a hydroxy group is 123 moles when the total number of moles of a carboxy group that is not used for imidization is taken as 100 moles) are charged, and a heating reaction was performed while the resultant mixture was stirred to progress the reaction while methanol was distilled out to raise a reaction temperature to about 220° C. When viscosity of a reaction product rapidly increased, cresol was added into this reaction system to dissolve the reaction product, and simultaneously cool a temperature of the solution to 80° C. Next, 0.04 mole of tetrabutyl titanate on a solid content was added into this solution, the resultant mixture was stirred for about 3 hours. Then, cresol and solvent naphtha were added into this reaction product and diluted to prepare low imide-modified polyesterimide varnish 12 having 40% by mass of a nonvolatile content.

Example 1

In this example, a multilayer insulated wire 1 shown in FIG. 1 was produced.

As the conductor 11, a cross-section rectangular (long side 3.1 mm×short side 1.9 mm, curvature radius of chamfered edge at four corners r=0.3 mm) conductor (copper having an oxygen content of 15 ppm) was used.

In the formation of the polyester-based resin layer 12A, a die having a shape similar to a shape of the polyester-based resin layer 12A formed on the conductor 11 was used. A 50 μm-thick polyester-based resin layer 12A was formed by coating the modified polyester varnish 1 on the conductor 11 by using the above-described die, and passing the resultant coated conductor through a baking furnace set at a furnace temperature of 450° C. and having a furnace length of 5 m at a speed at which the passing time became 15 seconds, and repeating the operations several times. Thus, an enameled wire was obtained.

A PEEK layer 13A was formed outside the polyester-based resin layer 12A by using the obtained enameled wire as a core wire, and using the extruder. The extruder had a 30 mm full-flight screw, in which L/D=20 and a compression ratio was adjusted to 3. A 55 μm-thick PEEK resin layer 13A was formed outside the polyester-based resin layer 12A by using, as a thermoplastic resin, polyether ether ketone (trade name: KetaSpire KT-820, manufactured by Solvay Specialty Polymers K.K.), and extruding the extrusion covering 13A of PEEK under extrusion conditions described below by using an extrusion die to be similar to a shape of the conductor 11 in an outer shape of a cross-section of the PEEK resin layer 13A.

Thus, a multilayer insulated wire 1 having a multilayer covering resin layer of which the total thickness is 105 μm was obtained.

With regard to the extrusion conditions (temperature), temperature control in a cylinder part of the extruder was divided into 3 zones, C1, C2 and C3, sequentially from a raw material charge side, and the C1 zone was set to 300° C., the C2 and C3 zones to 380° C., and a head portion behind a cylinder of the extruder to 390° C., and a die ahead of the head to 400° C.

Example 2

In this example, a multilayer insulated wire 3 shown in FIG. 3 was produced.

An enameled wire was obtained by forming a polyester-based resin layer 12A in the same manner as Example 1 except that modified polyesterimide varnish 8 was used in place of the modified polyester varnish 1, and a thickness of the polyester-based resin layer 12A was changed to 30 μm in Example 1.

A 10 μm-thick intermediate layer was formed by coating a polyamideimide resin (PAI) varnish (trade name: HI406, manufactured by Hitachi Chemical Co., Ltd.) on the polyester-based resin layer 12A by using a die having a shape similar to a shape of the conductor 11, and passing the resultant coated enameled wire through a baking furnace set at a furnace temperature of 550° C. and having a furnace length of 5 m at a speed at which the passing time became 15 seconds, and repeating the operations several times. Thus, an enameled wire with the intermediate layer 14 was obtained.

A multilayer insulated wire 3 was obtained by using the thus obtained enameled wire with the intermediate layer 14 as a core wire and forming a 40 μm-thick PEEK resin layer 13 outside the intermediate layer 14 in a manner similar to Example 1.

Examples 3 to 8

In those examples, multilayer insulated wires 1 shown in FIG. 1 were produced, respectively.

Multilayer insulated wires 1 each were obtained in the same manner as Example 1 except that modified polyester varnish, a thickness of the modified polyester-based resin layer, a PEEK resin and a thickness of the PEEK resin layer were changed, respectively, as shown in Table 1.

In Example 5, with regard to the extrusion conditions (temperature) of the modified PEEK resin (trade name: AvaSpire AV-650, manufactured by Solvay Specialty Polymers K.K.), the C1 zone was set to 300° C., the C2 and C3 zones to 380° C., and a head portion behind a cylinder of the extruder to 390° C., and a die ahead of the head to 400° C.

Examples 9 and 10

In those examples, multilayer insulated wires 3 shown in FIG. 3 were produced, respectively.

Multilayer insulated wires 3 each were obtained in the same manner as Example 2 except that modified polyester-imide varnish, a thickness of modified polyester-based resin layer 12, a thickness of the intermediate layer 14, and a thickness of the PEEK resin layer were changed, respectively, as shown in Table 1.

Examples 11 and 12

In those examples, multilayer insulated wires 1 shown in FIG. 1 were produced, respectively.

Multilayer insulated wires 1 each were obtained in the same manner as Example 1 except that a thickness of the polyester-based resin layer 12, and a thickness of the PEEK resin layer were changed, respectively, as shown in Table 1.

Example 13

In this example, a multilayer insulated wire 2 shown in FIG. 2 was produced.

Multilayer insulated wire 2 was obtained in the same manner as Example 1 except that modified polyester varnish, a thickness of polyester-based resin layer 12, and a thickness of the PEEK resin layer were changed, respectively, as shown in Table 1.

Examples 14 to 16

In those examples, multilayer insulated wires 1 shown in FIG. 1 were produced, respectively.

Multilayer insulated wires 1 each were obtained in the same manner as Example 1 except that modified polyester varnish, and a thickness of polyester-based resin layer 12 were changed, respectively, as shown in Table 2.

Example 17

In this example, a multilayer insulated wire 3 shown in FIG. 3 was produced.

Multilayer insulated wire 3 was obtained in the same manner as Example 2 except that modified polyester varnish, a thickness of the polyester-based resin layer 12, a thickness of the intermediate layer 14, and a thickness of the PEEK resin layer were changed, respectively, as shown in Table 2.

Examples 18 and 19

In those examples, multilayer insulated wires 1 shown in FIG. 1 were produced, respectively.

Multilayer insulated wires 1 were obtained in the same manner as Example 1 except that modified polyester varnish was changed, respectively, as shown in Table 2.

Comparative Example 1

In this example, a monolayer insulated wire having a polyester-based resin layer only was produced.

An insulted wire was obtained in the same manner as Example 1 except that modified polyester varnish 4 was used in place of the modified polyester varnish 1, and a thickness of the polyester-based resin layer was changed to 40 μm.

Comparative Example 2

In this example, a multilayer insulated wire having a multilayer covering resin layer constituted of a polyamideimide resin layer and a PEEK resin layer was produced.

A 30 μm-thick polyamideimide resin layer was formed by coating a polyamideimide resin varnish (trade name: HI406, manufactured by Hitachi Chemical Co., Ltd.) on the conductor 11, and passing the resultant coated conductor through a baking furnace set at a furnace temperature of 550° C. and having a furnace length of 5 m at a speed at which the passing time became 15 seconds, and repeating the operations several times, in a manner similar to Example 2. Thus, an enameled wire with the PAI layer was obtained.

Then, a multilayer insulated wire was obtained by using the thus obtained enameled wire with the PAI layer as a core wire, and forming a 55 μm-thick PEEK resin layer outside the PAI layer in the same manner as Example 1.

Comparative Example 3

In this example, a monolayer insulated wire having a PEEK resin layer only was produced.

A multilayer insulated wire was obtained by forming a 100 μm-thick PEEK resin layer outside the outer periphery of the conductor 11 in a manner similar to Example 1.

Comparative Example 4

In this example, a multilayer insulated wire having a multilayer covering resin layer constituted of a polyesterimide layer formed of an unmodified polyesterimide resin and a PEEK resin layer was produced.

A 45 μm-thick polyesterimide resin layer was formed by coating the unmodified polyesterimide varnish 11 on the conductor 11, and passing the resultant coated conductor through a baking furnace set at a furnace temperature of 550° C. and having a furnace length of 5 m at a speed at which the passing time became 15 seconds, and repeating the operations several times, in a manner similar to Example 2. Thus, an enameled wire was obtained.

Then, a multilayer insulated wire was obtained by using the thus obtained enameled wire as a core wire, and forming a 55 μm-thick PEEK resin layer outside the PEI layer in a manner similar to Example 1.

Comparative Example 5

In this example, a multilayer insulated wire having a double-layer covering resin layer constituted of a modified polyester resin layer and a low imide-modified polyesterimide resin layer was produced. This Comparative Example 5 was executed under assumption of the invention described in Patent Literature 1.

A 8 μm-thick modified polyester resin layer was formed by coating the modified polyester resin varnish 1 on the conductor 11, and passing the resultant coated conductor through a baking furnace set at a furnace temperature of 450° C. and having a furnace length of 5 m at a speed at which the passing time became 15 seconds, and repeating the operations several times, in a manner similar to Example 1.

Then, a 30 μm-thick low imide-modified polyesterimide resin layer was formed by coating the low imide-modified polyesterimide resin varnish 12 in a manner similar to the formation of the modified polyester resin layer. Thus, a multilayer insulated wire was obtained.

Comparative Example 6

In this example, a monolayer insulated wire having a polyester-based resin layer only was produced.

An insulated wire was obtained in the same manner as Comparative Example 1 except that the modified polyester resin varnish 1 was used, and the thickness of the polyester-based resin layer was changed to 100 μm.

Comparative Example 7

In this example, a multilayer insulated wire having a multilayer covering resin layer constituted of a modified polyester resin layer and a PES resin layer was produced.

A 50 μm-thick modified polyester resin layer was formed by coating the modified polyester resin varnish 1 on the conductor 11, and passing the resultant coated conductor through a baking furnace set at a furnace temperature of 450° C. and having a furnace length of 5 m at a speed at which the passing time became 15 seconds, and repeating the operations several times, in a manner similar to Example 1. Thus, an enameled wire was obtained.

Then, a 55 μm-thick PES resin layer was formed by using the thus obtained enameled wire as a core wire, and extruding PES resin (SUMIKA EXCEL 4800G (trade name, manufactured by Sumitomo Chemical Co., Ltd.)) on outside the modified PEst layer, in a manner similar to Example 1. Thus, a multilayer insulated wire was obtained.

In Comparative Example 7, with regard to the extrusion conditions (temperature) of the PES resin, the C1 zone was set to 360° C., the C2 zone to 370° C., C3 zone to 380° C., a head portion behind a cylinder of the extruder to 390° C., and a die ahead of the head to 390° C.

The following evaluations were carried out on the multilayer insulated wires each prepared as described above.

The obtained results are described in the following Tables 1 and 2 as a whole.

In the Tables, "amount of hydroxy group" represents a proportion (mole) of the hydroxy group based on 100 moles of the functional group such as the carboxy group.

[Adhesiveness Test]

An about 300 mm linear test specimen was elongated at a speed of 5±1 mm per second until each insulated wire is broken by using a tensile tester (trade name: Autograph AGS-J, manufactured by Shimadzu Corporation) in accordance with "adhesion test" specified in 5.5 in JIS C 3216-3. In addition, no cut-line was placed onto insulated wires each in this test.

With regard to two pieces of broken portions in the insulated wires each, a length of the covering resin layer formed of the polyester-based resin layer and the PEEK resin layer on 4 planes, the covering resin layer being peeled from a surface of the conductor 11, was measured. Maximum coating peeling lengths in coating peeled parts each of broken portions each were totalized, and evaluated depending on criteria described below.

A case where the total coating peeling length was 10 mm or less was expressed by "AA," a case where the length was over 10 mm and 50 mm or less was expressed by "A," a case where the length was over 50 mm and 100 mm or less was expressed by "B," and a case where the length was over 100 mm was expressed by "C."

As the evaluation, "B" is a target level to be achieved at minimum, and accordingly as the evaluation results in "A" to "AA," the evaluation approaches a particularly excellent level as a product.

[Bent Test]

An about 300 mm linear test specimen was preliminarily elongated at a speed of 5±1 mm per second into a predetermined elongation percentage in insulated wires each by using a tensile tester (trade name: Autograph AGS-J, manufactured by Shimadzu Corporation) in accordance with "adhesion test" specified in 5.5 in JIS C 3216-3. The elongation percentage was set to three levels; 10%, 20% and 30%.

Then, one line of 1.9 mm-long scratch was put on an edge plane (only one plane) of the insulated wires each within a depth of 5 μm in a direction perpendicular to an axial direction by using a sharp knife. In addition, "edge plane" means a plane in which short sides (sides along a vertical direction in FIGS. 1 to 3) in a longitudinal cross section of a rectangular insulated wire are continuously formed in the axial direction.

Subsequently, a round bar having a diameter of 1 mm was applied onto an edge plane on a side opposite to the scratched edge plane in such a manner that a length direction of the scratch is along an axial line of the round bar, and the insulated wire was bent at a tensile force of 40 N in a direction of 180 degrees. After elapse of 1 hour, the scratch in the multilayer insulated wire was visually observed under a state of being bent to evaluate presence or absence of occurrence of cracks reaching a conductor depending on criteria described below.

A case where no cracks reaching the conductor were unconfirmable even when preliminary elongation was performed at an elongation percentage of 30% was expressed by "AA," a case where no cracks reaching the conductor were unconfirmable when the preliminary elongation was performed at an elongation percentage of 20% and cracks reaching the conductor were confirmable when the preliminary elongation was performed at an elongation percentage of 30% was expressed by "A," a case where no cracks reaching the conductor were unconfirmable when the preliminary elongation was performed at an elongation percentage of 10% and the cracks reaching the conductor were confirmable when the preliminary elongation was performed at an elongation percentage of 20% was expressed by "B," and a case where the cracks reaching the conductor were confirmable even when the preliminary elongation was performed at an elongation percentage of 10% was expressed by "C."

As the evaluation, "B" is a target level to be achieved at minimum, and accordingly as the evaluation results in "A" to "AA," the evaluation approaches a particularly excellent level as a product.

[Electrical Property (Partial Discharge Inception Voltage (PDIV)) Test]

The partial discharge inception voltage of produced each insulated wire was measured, using a partial discharge tester "KPD2050" (manufactured by Kikusui Electronics Corp, trade name).

Two pieces of the respective insulated wire were brought into close contact with each other with plane contact at the flat planes without any space therebetween over a length of 150 mm, thereby to produce a sample. An electrode was provided between the two conductors of each sample and connected to the conductors of the sample. Then, while an AC voltage of 50 Hz was applied, at a temperature 25° C., the voltage was continuously raised up. Base on the voltage at the time when a partial discharge of 10 pC occurred, a peak voltage (Vp) was read. In addition, "flat plane" means a plane in which long sides (sides along a horizontal direction in FIGS. 1 to 3) in a longitudinal cross section of a rectangular multilayer insulated wire are continuously formed in the axial direction.

A case where the peak voltage was 1,200 (Vp) or more was expressed by "AA," a case where the peak voltage was 1,000 (Vp) or more and less than 1,200 (Vp) was expressed by "A" and a case where the peak voltage was less than 1,000 (Vp) was expressed by "C."

As the evaluation, "A" or more is a passable level, and "AA" is a particularly excellent level as the product.

[ATF Resistance Test]

An about 300 mm linear test specimen was placed in a closable vessel together with ATF (automatic transmission fluid) oil in which a moisture content was adjusted to 0.2% by mass. The test specimen was removed after elapse of 1,000 hours at a temperature of 150° C. The oil attached on the test specimen was wiped off, and then electrical properties (breakdown voltage) were evaluated.

The breakdown voltage was measured in accordance with "breakdown" specified in 4. in JIS C 3216-5. Retention was calculated by the following formula. A case where the retention of the breakdown voltage after the ATF test was 30% or more was expressed by "AA," and a case where the retention was less than 30% was expressed by "C."

retention (%)=breakdown voltage (kV) before ATF test/breakdown voltage (kV) after ATF test×100    Formula:

As the evaluation, "AA" is a passable level.

TABLE 1

| | | Example | | | | | | | |
|---|---|---|---|---|---|---|---|---|---|
| | | 1 | 2 | 3 | 4 | 5 | 6 | 7 | 8 |
| Polyester-based resin layer | Resin | Modified PEst | Modified PEI | Modified PEst | Modified PEst | Modified PEst | Modified PEst | Modified PEst | Modified PEst |
| | varnish | 1 | 8 | 1 | 2 | 1 | 2 | 3 | 4 |
| | Thickness (μm) | 50 | 30 | 40 | 40 | 40 | 40 | 40 | 35 |
| Trihydric or higher hydric alcohol constituent | Kinds | THEIC | THEIC | THEIC | THEIC | THEIC | THEIC | THEIC | THEIC |
| | Content (mol %) | 70 | 60 | 70 | 50 | 70 | 50 | 30 | 80 |
| | Amount of hydroxy group (mol) | 150 | 130 | 150 | 139 | 150 | 138 | 128 | 156 |
| intermediate layer | Resin | — | PAI | — | — | — | — | — | — |
| | Thickness (μm) | — | 10 | — | — | — | — | — | — |
| PEEK resin layer | Resin | PEEK | PEEK | PEEK | PEEK | Modified PEEK | PEEK | PEEK | PEEK |
| | Thickness (μm) | 55 | 40 | 80 | 80 | 80 | 80 | 80 | 35 |
| Total thickness | (μm) | 105 | 80 | 120 | 120 | 120 | 120 | 120 | 70 |
| proportion of the thickness of the PEEK resin layer | (%) | 52 | 50 | 67 | 67 | 67 | 67 | 67 | 50 |
| Adhesiveness test | | AA | AA | AA | AA | AA | AA | AA | AA |
| Bent test | | AA | AA | AA | AA | AA | AA | AA | AA |
| Electrical property test | | AA | AA | AA | AA | AA | AA | AA | AA |
| ATF resistance test | | AA | AA | AA | AA | AA | AA | AA | AA |

| | | Example | | | | |
|---|---|---|---|---|---|---|
| | | 9 | 10 | 11 | 12 | 13 |
| Polyester-based resin layer | Resin | Modified PEI | Modified PEst | Modified PEst | Modified PEst | Modified PEI |
| | varnish | 8 | 1 | 1 | 1 | 8 |
| | Thickness (μm) | 50 | 60 | 20 | 20 | 70 |
| Trihydric or higher hydric alcohol constituent | Kinds | THEIC | THEIC | THEIC | THEIC | THEIC |
| | Content (mol %) | 60 | 70 | 70 | 70 | 60 |
| | Amount of hydroxy group (mol) | 130 | 150 | 150 | 150 | 130 |
| intermediate layer | Resin | PAI | PAI | — | — | — |
| | Thickness (μm) | 20 | 20 | — | — | — |
| PEEK resin layer | Resin | PEEK | PEEK | PEEK | PEEK | PEEK |
| | Thickness (μm) | 100 | 120 | 40 | 70 | 20 |

TABLE 1-continued

|  |  |  |  |  |  |  |
|---|---|---|---|---|---|---|
| Total thickness | (μm) | 170 | 200 | 60 | 90 | 90 |
| proportion of the thickness of the PEEK resin layer | (%) | 59 | 60 | 67 | 78 | 22 |
| Adhesiveness test |  | AA | AA | AA | B | AA |
| Bent test |  | AA | AA | AA | A | AA |
| Electrical property test |  | AA | AA | A | AA | AA |
| ATF resistance test |  | AA | AA | AA | AA | AA |

"Amount of hydroxy group" represents a proportion (mole) of the hydroxy group based on 100 moles of the functional group such as the carboxy group.
"Modified PEst" represents a modified polyester resin,
"Modified PEI" represents a modified polyether imide resin, and
"THEIC" represents trihydroxyethyl isocyanurate.

TABLE 2

|  |  | Example | | | | | |
|---|---|---|---|---|---|---|---|
|  |  | 14 | 15 | 16 | 17 | 18 | 19 |
| Polyester-based resin layer | Resin varnish | Modified PEst 5 | Modified PEst 6 | Modified PEst 7 | Modified PEst 1 | Modified PEst 9 | Modified PEst 10 |
|  | Thickness (μm) | 45 | 45 | 45 | 60 | 50 | 50 |
| Trihydric or higher hydric alcohol constituent | Kinds | THEIC | THEIC | GRY | THEIC | HTO | THEIC |
|  | Content (mol %) | 10 | 95 | 70 | 70 | 70 | 100 |
| Amount of hydroxy group (mol) |  | 117 | 164 | 150 | 150 | 150 | 167 |
| intermediate layer | Resin | — | — | — | PAI | — | — |
|  | Thickness (μm) | — | — | — | 20 | — | — |
| PEEK resin layer | Resin | PEEK | PEEK | PEEK | PEEK | PEEK | PEEK |
|  | Thickness (μm) | 55 | 55 | 55 | 160 | 55 | 55 |
| Total thickness | (μm) | 100 | 100 | 100 | 240 | 105 | 105 |
| proportion of the thickness of the PEEK resin layer | (%) | 55 | 55 | 55 | 67 | 52 | 52 |
| Adhesiveness test |  | B | AA | AA | AA | B | A |
| Bent test |  | A | A | A | A | A | B |
| Electrical property test |  | AA | AA | AA | AA | AA | AA |
| ATF resistance test |  | AA | AA | AA | AA | AA | AA |

|  |  | Comparative Example | | | | | | |
|---|---|---|---|---|---|---|---|---|
|  |  | 1 | 2 | 3 | 4 | 5 | 6 | 7 |
| Polyester-based resin layer | Resin | Modified PEst | PAI | — | Unmodified PEI | Unmodified PEst | Unmodified PEst | Unmodified PEst |
|  | varnish | 4 | — | — | 11 | 1 | 1 | 1 |
|  | Thickness (μm) | 40 | 30 | — | 45 | 8 | 100 | 50 |
| Trihydric or higher hydric alcohol constituent | Kinds | THEIC | — | — | — | THEIC | THEIC | THEIC |
|  | Content (mol %) | 80 | — | — | 0 | 70 | 70 | 70 |
| Amount of hydroxy group (mol) |  | 155 | — | — | 100 | 150 | 150 | 150 |
| intermediate layer | Resin | — | — | — | — | Modified PEI | — | — |
|  | Thickness (μm) | — | — | — | — | 30 | — | — |
| PEEK resin layer | Resin | — | PEEK | PEEK | PEEK | — | — | PES |
|  | Thickness (μm) | — | 55 | 100 | 55 | — | — | 55 |
| Total thickness | (μm) | 40 | 65 | 100 | 100 | 38 | 100 | 105 |
| proportion of the thickness of the PEEK resin layer | (%) | 0 | 65 | 100 | 55 | 0 | 0 | 52 |
| Adhesiveness test |  | AA | C | C | C | AA | AA | AA |
| Bent test |  | A | C | C | A | A | A | AA |
| Electrical property test |  | C | AA | AA | AA | C | AA | AA |
| ATF resistance test |  | C | AA | AA | AA | C | C | C |

"Amount of hydroxy group" represents a proportion (mole) of the hydroxy group based on 100 moles of the functional group such as the carboxy group.
"Modified PEst" represents a modified polyester resin,
"Modified PEI" represents a modified polyether imide resin,
"Unmodified PEI" represents an unmodified polyether imide resin,
"THEIC" represents trihydroxyethyl isocyanurate,
"GRY" represents glycerol, and
"HTO" represents hexanetriol.

As is obvious from the results in Table 1, the multilayer insulated wires in Examples 1 to 19 passed all of the adhesiveness test, the bent test (the test on the cracks reaching the conductor), the electrical properties and the ATF resistance, and both the electrical properties and the adhesion with the conductor, which was hitherto difficult to be satisfied, was able to be improved, and the cracks reaching the conductor was able to be prevented, and the ATF resistance was also able to be improved.

In the case where the content of the trihydric or higher hydric alcohol constituent is 30 to 90 mol %, both the adhesion and the bending processability were able to be improved with a good balance without adversely affecting the electrical properties and the ATF resistance.

In particular, in the case where the trihydric or higher hydric alcohol constituent is the constituent derived from the aliphatic alcohol, both were able to be improved to a further higher level.

Further, in the case where the total thickness and the proportion of the thickness of the PEEK resin layer are within the above-described ranges, the electrical properties and the ATF resistance were able to be improved or enhanced without reducing high adhesion and bending processability.

Thus, the insulated wires were able to simultaneous have the adhesion, the bending processability and the electrical properties, and further preferably to be provided with excellent ATF resistance by forming the multilayer covering resin layer into at least double-layered structure in which the polyester-based resin layer was formed as a lower layer, and the PEEK layer was formed as an upper layer.

In contrast, as is obvious from the results in Table 2, in the insulted wires in Comparative Example 1 in which the insulated wire has no PEEK resin layer, even if the insulated wire has the polyester-based resin layer formed of the polyester-based resin at least containing the trihydric or higher hydric alcohol constituent, in Comparative Example 5 in which the insulated wire has a low imide-modified polyesterimide layer in place of the PEEK resin layer, and in Comparative Example 7 in which the insulated wire has a PES layer in place of the PEEK resin layer, at least one of the electrical properties and the ATF resistance was unsatisfied.

Moreover, in Comparative Example 2 in which the insulated wire has no polyester-based resin layer formed of the polyester-base resin at least containing the trihydric or higher hydric alcohol constituent, even if the insulated wire has the PEEK resin layer, both the adhesion test and the bent test did not reach even the target level to be achieved at minimum.

Further, in Comparative Example 4 in which the insulated wire has the polyester-based resin layer formed of the non-modified polyester-based resin containing neither trihydric nor higher hydric alcohol constituent, even if the insulated wire has the PEEK resin layer, the adhesion test did not reach even the target level to be achieved at minimum.

In the insulated wire in Comparative Example 3 in which the insulated wire has PEEK resin layer only, both the adhesion test and the bent test did not reach even the target level to be achieved at minimum.

In Comparative Example 6 in which the insulated wire has no PEEK resin layer, even if the polyester-based resin layer formed of the polyester-based resin at least containing the trihydric or higher hydric alcohol constituent is formed at a thickness of 100 μm, the bending processability, the electrical properties and durability were found to be satisfactory, but both the above properties and the ATF resistance were found to be unsatisfiable.

From the above-described results, the multilayer insulated wire of the present invention is found to be preferably applicable to ordinary electrical equipment, and to a rotating electric machine for HV or EV, and the like in which achievement of size reduction and high performance is rapidly progressing.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1, 2, 3 Multilayer insulated wire
11 Conductor
12A, 12B Polyester-based resin layer
13A, 13B PEEK resin layer
14 Intermediate layer

The invention claimed is:

1. A multilayer insulated wire, comprising a polyester-based resin layer formed by applying and baking a varnish of a polyester-based resin containing at least a trihydric or higher hydric alcohol constituent on a conductor, and a PEEK resin layer formed of polyether ether ketone or PEEK-based PPS, PES, PPSU or PEI polymer alloys, directly or by interposing an intermediate layer, as an extrusion covering on the polyester-based resin layer.

2. The multilayer insulated wire according to claim 1, wherein a content of the trihydric or higher hydric alcohol constituent is 30 to 90 mol % based on the total number of moles of the alcohol constituent that forms the polyester-based resin.

3. The multilayer insulated wire according to claim 1, wherein the trihydric or higher hydric alcohol constituent is a constituent derived from aliphatic alcohol.

4. The multilayer insulated wire according to claim 1, wherein the trihydric or higher hydric alcohol constituent is a constituent derived from one or more compounds comprising trihydroxyethyl isocyanurate, glycerol or trimethylolpropane.

5. The multilayer insulated wire of claim 1, wherein a total thickness of the polyester-based resin layer, the intermediate layer, if present, and the PEEK resin layer is 70 to 250 μm, and a proportion of the thickness of the PEEK resin layer to the total thickness is 20 to 70%.

6. The multilayer insulated wire according to claim 1, wherein the conductor has a rectangular cross-section.

7. A coil formed by winding processing the multilayer insulated wire according to claim 1.

8. Electronic/electrical equipment, comprising the coil according to claim 7.

9. A multilayer insulated wire, comprising:
 a polyester-based resin layer, comprising a polyester-based resin, which comprises at least a trihydric or higher hydric alcohol constituent, wherein the polyester-based resin layer is in direct contact with and around an outer periphery of a conductor; and
 a PEEK resin layer, comprising polyether ether ketone or modified polyether ether ketone PEEK-based PPS, PES, PPSU or PEI polymer alloys, directly or by interposing an intermediate layer, on the polyester-based resin layer.

* * * * *